UNITED STATES PATENT OFFICE.

MARK C. RICH, OF HOT SPRINGS, SOUTH DAKOTA.

MANUFACTURE OF ALFALFA PRODUCTS.

1,104,136.     Specification of Letters Patent.     Patented July 21, 1914.

No Drawing.     Application filed November 28, 1911. Serial No. 662,920.

*To all whom it may concern:*

Be it known that I, MARK C. RICH, a resident of Hot Springs, in the county of Fall River and State of South Dakota, have invented certain new and useful Improvements in the Manufacture of Alfalfa Products, of which the following is a full, clear, and exact description.

The invention relates to the manufacture of food products from alfalfa. This material has long been recognized as a good food for cattle or stock because of its tissue-building properties, but has not been used for human food because it was not palatable as usually treated or prepared for stock or cattle.

In the preparation of alfalfa as a food for cattle or stock, it is usually left to grow until it is about 30 to 35 days old and is about half in bloom. At this stage of its growth, the alfalfa is about 20 to 24 inches high, and is woody, fibrous, somewhat hard and is of such a character that it has not been considered desirable for human food.

By experiments, I have discovered that if alfalfa is harvested and treated as hereinafter set forth, it may be utilized in the preparation of foods for human consumption, and may be rendered both palatable and digestible.

According to the present improvement, the alfalfa is cut, when it is from 8 to 12 inches high and approximately 14 days old, and before it has become woody, fibrous and hard, as compared with its condition when it is about 30 to 35 days old and approximately from 20 to 24 inches high. By cutting the alfalfa at the earlier stage pointed out, the products made therefrom will lack the woody and fibrous properties which have made it undesirable for human consumption. The alfalfa is cut about 4 inches above the ground leaving about 4 inches stubble. As it is cut by a mower, it is caught in baskets and deposited in small bunches of about a bushel each, and laid on the stubble where it is permitted to remain for about 24 hours and during that period, the air will circulate through the bunches, and the leaves of the alfalfa will wilt and the stems will be partially dried so that about one half of the inherent moisture in the alfalfa will be removed. This treatment of alfalfa which has been cut at the stage pointed out, sweetens the odor of and partially cures the alfalfa. Next, the alfalfa is gathered and stored very loosely in layers or on racks and subjected to artificial heat of approximately 150 degrees Fahrenheit, from 3 to 7 days. This treatment prevents bleaching and causes the alfalfa to retain its desirable flavor or aroma and remain light green in color. The period in which the alfalfa is subjected to artificial heat is varied according to the amount of moisture in the alfalfa and the weather. The alfalfa, after it has been thus dried is then ground. This product may then be used in the preparation of different foods or beverages for human consumption.

It has been found that a beverage containing nutritive properties of alfalfa and having a taste and flavor resembling tea, may be made by roasting the ground green alfalfa from 5 to 10 minutes, which will cause it to turn brownish in color and modifies the flavor, and mixing one part of the browned or roasted ground alfalfa and three parts of ground green alfalfa and by the addition of hot water. This beverage has the flavor and contains the food-values and medicinal properties of alfalfa.

By this improved method, alfalfa is rendered desirable and palatable for human consumption and the inherent tissue-building properties are made available for human use.

The invention is not to be understood as restricted to the precise practice hereinbefore set forth, since it may be modified within the scope of the appended claims, without departing from the scope and spirit of the invention.

Having thus described the invention, what I claim as new and desire to secure by Letters Patent, is:

1. That improvement in the treatment of alfalfa which consists in cutting it before it has become woody and fibrous, and then partially curing it and then treating it to prevent bleaching.

2. That improvement in the treatment of alfalfa which consists in cutting it before it has become woody and fibrous, partially curing it in the field and subjecting it to artificial heat.

3. That improvement in the treatment of alfalfa which consists in cutting it before it has become woody and fibrous, partially curing it in the field and then treating it for a sufficient period to prevent bleaching.

4. That improvement in the treatment of alfalfa, which consists in cutting it before it has become woody and fibrous, then curing and heating it to prevent bleaching, and then grinding it.

5. That improvement in the treatment of alfalfa which consists in cutting it before it has become woody and fibrous, partially curing it in the field, then subjecting it to artificial heat, and then grinding it.

6. That improvement in the preparation of alfalfa for consumption which consists in cutting it before it has become woody and fibrous, then partially curing it, then treating it to prevent bleaching, and then grinding it, and then roasting it.

7. That improvement in the preparation of alfalfa for consumption which consists in cutting it before it has become woody and fibrous, partially curing it in the field, then subjecting it to artificial heat, then grinding it, and then roasting it.

8. That improvement in the preparation of alfalfa for consumption which consists in cutting it before it has become woody and fibrous, then curing it, then grinding it, then mixing a quantity of the unroasted ground product with a quantity of the roasted product.

9. That improvement in the preparation of alfalfa for consumption which consists in cutting it before it has become woody and fibrous, partially curing it in the field, then subjecting it to artificial heat for three days and then grinding it.

10. An alfalfa product adapted for human consumption containing dried ground young alfalfa which is naturally free from woody fiber and a quantity of ground roasted alfalfa.

Signed at Chicago, Illinois, this 28th day of October, A. D. 1911.

MARK C. RICH.

Witnesses:
FRED GERLACH,
F. W. BOWER.